United States Patent [19]

Hardy

[11] Patent Number: 6,115,465
[45] Date of Patent: Sep. 5, 2000

[54] SYSTEM AND METHOD FOR MODIFYING VOICE SIGNALS TO AVOID TRIGGERING TONE DETECTORS

[75] Inventor: William Christopher Hardy, Dallas, Tex.

[73] Assignee: MCI Communications Corporation, Washington, D.C.

[21] Appl. No.: 09/047,485

[22] Filed: Mar. 25, 1998

[51] Int. Cl.[7] .............................. H04M 1/50; H04M 1/00
[52] U.S. Cl. ......................... 379/386; 379/351; 379/352
[58] Field of Search ........................ 379/31, 50, 22, 379/23, 100.14, 114, 124, 180, 237, 283, 282, 284, 286, 339, 341, 359, 351, 352, 387, 386

[56] References Cited

U.S. PATENT DOCUMENTS

| | | | |
|---|---|---|---|
| 4,042,790 | 8/1977 | Richards | 379/351 |
| 4,521,647 | 6/1985 | Olson et al. | 379/351 |
| 5,257,309 | 10/1993 | Brandman et al. | 379/386 |
| 5,438,618 | 8/1995 | Jantzi et al. | 379/351 |
| 5,519,764 | 5/1996 | Pierce et al. | 379/351 |

*Primary Examiner*—Wing F. Chan

[57] ABSTRACT

A system and method for modifying voice signals to avoid triggering tone detectors in a telephone network. The system includes a voice processor coupled between the handset and station set of a conventional telephone unit. The voice processor modifies the voice signal to prevent triggering DTMF tone detectors.

22 Claims, 2 Drawing Sheets

SYSTEM AND METHOD FOR MODIFYING VOICE SIGNALS TO AVOID TRIGGERING TONE DETECTORS

CROSS-REFERENCE TO RELATED APPLICATIONS

This application is related to a commonly-owned, copending application filed concurrently herewith, entitled "Method and Apparatus for Suppressing Echo in Telephony" having application number (to be assigned, Attorney Docket Number CCK-96-008), which is incorporated herein by reference in its entirety.

BACKGROUND OF THE INVENTION

1. Field of the Invention

The present invention relates generally to telephony, and more particularly to tone detection.

2. Related Art

Among analog telephones the most common way to transmit dialing information is by sending pairs of sinusoidal tones at relatively high signal levels. This technique is known as dual-tone multiple frequency (DTMF) and is also commonly called TouchTone (formerly a trademark of AT&T). Telephones and other equipment that use DTMF tones must assert a pair of tones at specific prescribed frequencies and signal levels in order to communicate digits. Other equipment in a telephone network that must be receptive to such dialing information typically incorporates a tone detector or DTMF detector.

The DTMF signaling convention is designed to reliably convey dialed digits while preventing spurious detection of non-dialing signals, such as normal speech during a telephone conversation. The DTMF detectors are intended to be very robust. In order for a signal to qualify as a DTMF tone, there must be exactly two strong sinusoidal signals present—one from a low-frequency group (697, 770, 852 or 941 Hz) and one from a high-frequency group (1209, 1336, 1477 or 1633 Hz). As transmitted, each frequency must be within 1.5% of its nominal frequency, and must persist steadily for at least 50 ms. As received by a tone detector, each frequency must be within 3.5% of its nominal frequency, and must persist steadily for at least 25 ms. In addition, the signal level received at the tone detector must exceed −55 dBm. The frequency plan is carefully chosen so that harmonics and intermodulation products are unlikely to emulate any of the other possible valid tone combinations, and is documented in Bellcore BOC Notes on the LEC Networks 1994, SR-TSV-002275, Issue 2, April 1994, paragraph 6.13.2.

A tone detector may use even more sophisticated techniques to further ensure that the two tones presented are the principal components of the signal energy. In most cases, a speech signal will occupy a broad spectrum. A spectral analysis or signal-to-noise analysis should be able to readily distinguish a voice from a pair of pure tones.

Despite all of the measures taken to avoid spurious triggering of DTMF detectors by voice signals, there are instances where a particular telephone user's voice often satisfies a DTMF detector. During a telephone call, this user is frequently disconnected or unintentionally diverted to another calling feature. For example, this user's speech may emulate the tones generated by pressing the "#" key on the keypad of a TouchTone telephone, causing the network to disconnect the call and give the user a dial tone in expectation of further dialing instructions. These users are uniquely plagued with the frustration of using a telephone network that handles their voice unreliably. What is needed is a way to prevent voice signals from triggering tone detectors.

SUMMARY OF THE INVENTION

The present invention is a system and method for modifying voice signals to avoid triggering tone detectors such as DTMF detectors in a conventional telephone system. The system includes a voice processor coupled between the microphone in the telephone handset and the on-hook/off-hook control point in the telephone station set.

In one embodiment, the voice processor includes a variable delay unit and a controller coupled to the variable delay unit. The controller operates the variable delay unit so as to shift one or more frequency bands in the voice signal provided via the telephone handset by a predetermined frequency at a predetermined rate. This variation is sufficient to avoid triggering DTMF tone detectors.

In another embodiment, the voice processor reduces the power level in one or more predetermined frequency bands of the voice signal to a predetermined power level. The frequency bands are selected to coincide with the DTMF frequencies that should not be triggered by the voice signal. The power level is selected to keep the voice signal power within the selected frequency bands below the level necessary to trigger a tone detector.

One advantage of the present invention is that it modifies voice signals to avoid triggering tone detectors without significantly degrading the quality of the voice signal.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE FIGURES

The present invention will be described with reference to the accompanying drawings, wherein.

DETAILED DESCRIPTION OF THE PREFERRED EMBODIMENTS

The present invention is a signal processing technique that assures that a voice signal will not meet all of the criteria that most DTMF tone detectors rely upon for tone detection. In one embodiment of the present invention, a slight frequency shifting is applied to the voice signal so that a tone detector cannot phase-lock upon the resulting signal. In a preferred embodiment, selected frequency components of the voice signal are repeatedly shifted in frequency by a predetermined frequency shift at a predetermined shifting rate. The frequency shift and shifting rate are selected to be almost imperceptible to the human ear, yet large enough to prevent a tone detector from confusing the voice signal with a DTMF tone.

In another embodiment, the voice processor reduces the power level in one or more predetermined frequency bands of the voice signal to a predetermined power level. In one embodiment, the frequency bands are selected to coincide with selected DTMF frequencies that should not be triggered by the voice signal, and the power level is selected to be below the level necessary to trigger a tone detector.

While various embodiments of the present invention are presented below, they are intended to be illustrative rather than limiting. As will be apparent to one skilled in the relevant arts, substantial variations of these embodiments are well within the spirit and scope of the present invention.

When used with a conventional telephone set, the present invention should be electrically coupled between the microphone and the mouth lead of the on-hook/off-hook control point. In one type of telephone set, the microphone is located in a handset and the on-hook/off-hook control point is located in a station set (a base unit, typically including the keypad). In one embodiment, the present invention is envisioned as an adjunct unit that may be attached between the handset and station set in a conventional telephone set. This allows processing of the voice signal without disturbing the "legitimate" DTMF signals that are typically generated in the station set. This also allows for the present invention to be packaged as a small, portable unit that the user can carry from telephone to telephone. In another embodiment, the invention is integral with the handset or the station set.

In other types of conventional telephone sets the handset and station set are integral, such as in a cordless phone or cellular phone. In these units, the present invention may be housed within the integral telephone set between the microphone and the mouth lead of the on-hook/off-hook control point.

Figure 1:
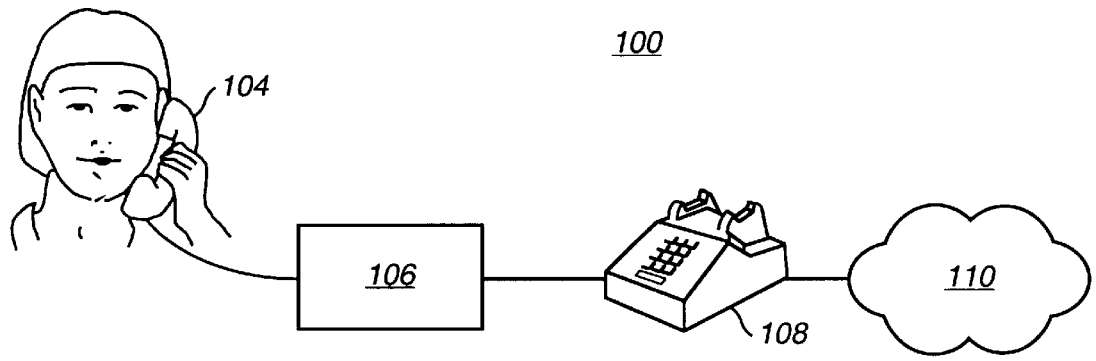
FIG. 1 is a high-level block diagram of a telephone system 100 including one embodiment of the present invention.

FIG. 1 is a high-level block diagram of a telephone system 100 including one embodiment of the present invention. Telephone system 100 includes telephone handset 104, voice processor 106, telephone station set 108, and telephone network 110. Telephone handset 104 includes a microphone for generating voice signals in response to a user's speech. Voice processor 106 receives the voice signal from handset 104 via an input port and provides the processed signal to station set 108 via an output port.

Telephone station set 108 includes an on-hook/off hook control point for making connections between the microphone, telephone network 110, and one or more other functional units, as would be apparent to one skilled in the relevant arts. These functional units can include, but are not limited to, a numeric keypad, a DTMF generator for generating tones in response to keypad selections, a dial pulse generator for generating dial pulses in response to keypad selections, a ringer, and one or more hold or option buttons and associated control logic for performing various functions, such as putting a caller "on hold." The on-hook/off-hook typically includes a mouth lead for connection to a microphone located in the telephone handset.

As described above, voice processor 106 modifies the voice signals generated by the user over the microphone in telephone handset 104 to prevent the voice signals from emulating one or more DTMF tones generated by telephone station set 108 for transmission over telephone network 110.

In a first embodiment, the voice processing is performed by using a time-domain phase-shifter to repetitively shift the frequency of the voice signal by a predetermined frequency at a predetermined rate. Time-domain phase-shifters are well-known in the field of music electronics. One such approach involves using an analog delay line (also known as a "bucket brigade" circuit) which clocks the signal through a pipeline of cascaded sample-and-hold circuits. By varying the clock frequency while sampled signals pass through the device, the apparent time axis is distorted resulting in a shift in the frequencies of the voice signal.

Figure 2:
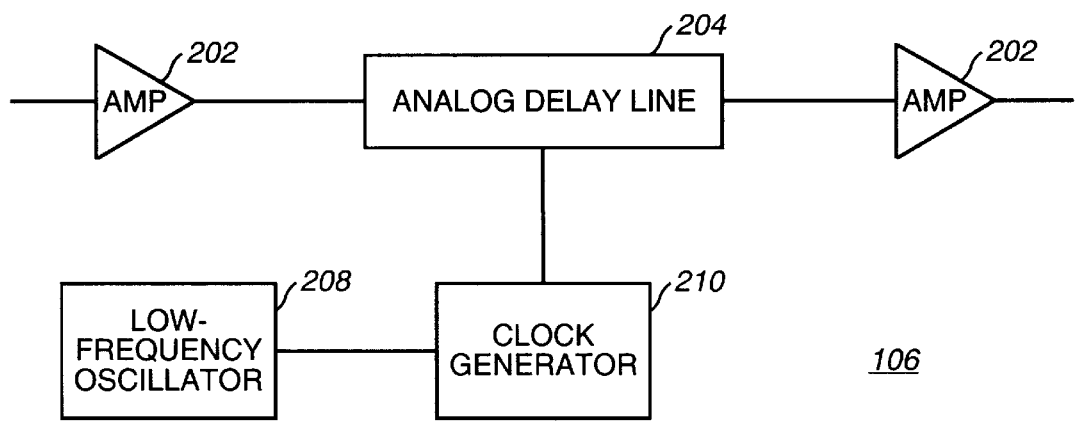
FIG. 2 is a circuit block diagram of an implementation of a voice processor according to a first embodiment of the present invention.

FIG. 2 is a circuit block diagram of an implementation of voice processor 106 according to a first embodiment of the present invention. In this embodiment, voice processor 106 includes amplifiers 202, analog delay line 204, low-frequency oscillator 208 and clock generator 210. Low-frequency oscillator 208 provides a sinusoidal signal to control the rate of frequency shifting. In response to this signal, clock generator 210 provides a clock signal to analog delay line 204. Analog delay line 204, in turn, imposes a variable delay on the incoming voice signal according to the clock signal provided by clock generator 210.

Voice processor 106 operates to repeatedly shift the frequency of the voice spectrum by a predetermined frequency shift. The rate of the shifting is determined by the frequency of the signal provided by low-frequency oscillator 208. In a preferred embodiment, the frequency of the signal provided by low-frequency oscillator 208 is approximately 40 Hz, and so the frequency shifting occurs at a rate of approximately 40 Hz. The magnitude of the frequency shift applied is determined by the amplitude of the signal provided by low-frequency oscillator 208. In a preferred embodiment of the present invention, the magnitude of the frequency shift applied is approximately ±2.5% of the center frequency of the voice signal.

Clock generator 210 is an off-the-shelf commercial device. The nominal clocking rate of the signal provided by clock generator 210 to analog delay line 204 should be sufficient to satisfy the Nyquist criterion for sampling the analog voice signal, as would be apparent to one skilled in the relevant art. In a preferred embodiment, the frequency of the signal produced by clock generator 210 is at least 8 kHz.

Analog delay line 204 is also an off-the-shelf commercial device. Such a device is usually specified by its sample capacity (also known as "depth"). One such device is the SAD1024, which has a depth of 1024 samples. In a preferred embodiment, the depth of analog delay line 204 is sufficient to accommodate all of the samples generated during a complete cycle of the signal produced by low-frequency oscillator 208.

In a preferred embodiment of the present invention, amplifiers 202 are included to adjust the power levels of the incoming voice signal and the outgoing processed voice signal.

In a second embodiment, the voice processing is also accomplished through frequency shifting in the time domain, but by digital means. In this embodiment, voice processor 106 can be implemented using an analog-to-digital converter, a digital shift register or circular buffer, and a digital-to-analog converter.

Figure 3:
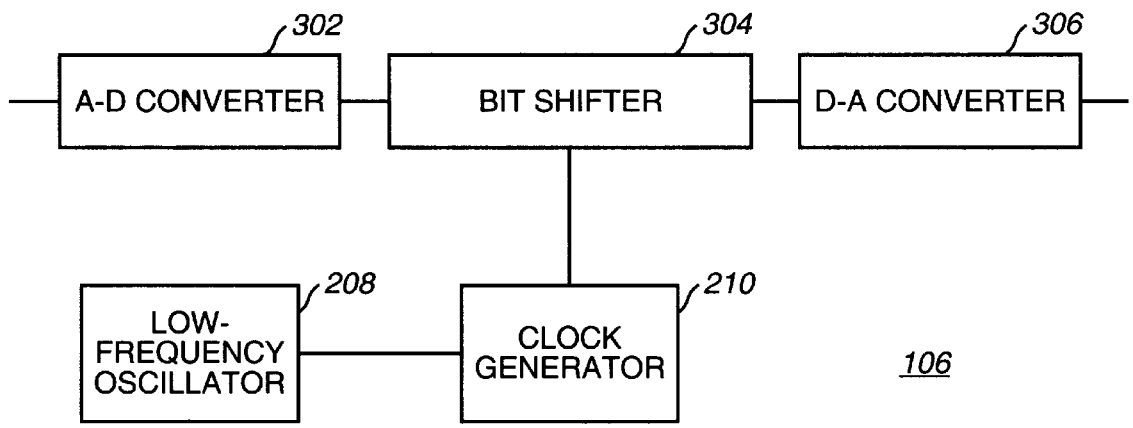
FIG. 3 is a circuit block diagram of an implementation of a voice processor according to a second embodiment of the present invention.

FIG. 3 is a circuit block diagram of an implementation of voice processor 106 according to a second embodiment of the present invention. In this embodiment, voice processor 106 includes analog-to-digital (A-D) converter 302, bit shifter 304, digital-to-analog (D-A) converter 306, low-frequency oscillator 208 and clock generator 210. A-D converter 302 converts the incoming analog voice signal to a digital signal comprising a stream of bits. Bit shifter 304 imposes an oscillating time shift on the incoming stream of bits of a magnitude and at a frequency determined by low-frequency oscillator 208 as described above. D-A converter 306 then converts the shifted stream of bits to an analog signal for provision to telephone station set 108.

In a third embodiment, the voice processing is accomplished through frequency shifting in the frequency domain. In a preferred embodiment, a discrete Fourier transform (DFT) is applied to the incoming voice signal, the transformed values are shifted in the frequency domain, and an inverse DFT is applied to the shifted values. This technique permits shifting of all frequency components by the same frequency shift rather than in proportion to component frequency. This technique also permits shifting only selected frequency components rather than the entire spectrum, or only one frequency band, of the voice signal. For example, the voice processor could be tuned to modify only those frequency bands corresponding to the seven specified DTMF frequencies, while leaving the remaining components of the voice signal unaltered.

Figure 4:
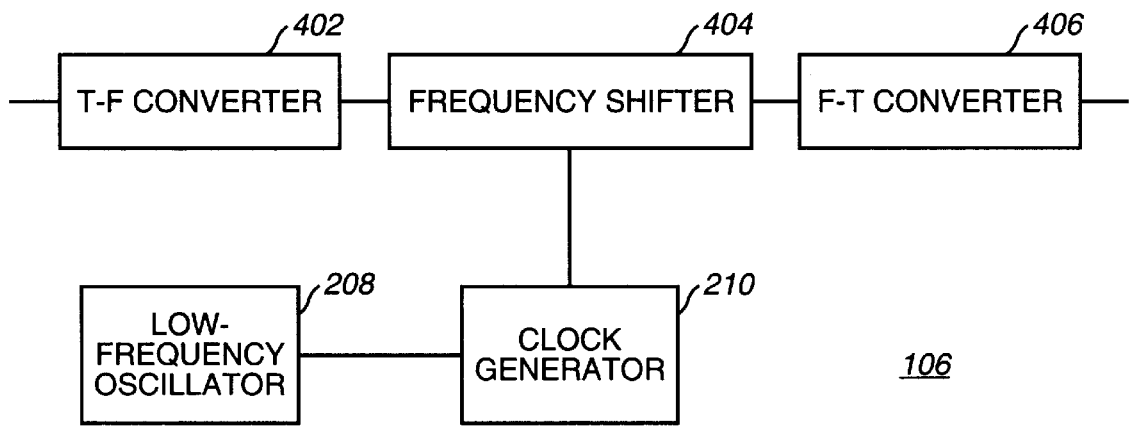
FIG. 4 is a circuit block diagram of an implementation of a voice processor according to a third embodiment of the present invention.

FIG. 4 is a circuit block diagram of an implementation of voice processor 106 according to a third embodiment of the present invention. In this embodiment, voice processor 106 includes a time-to-frequency (T-F) converter 402, a frequency shifter 404, a frequency-to-time (F-T) converter 406, a low-frequency oscillator 208 and a clock generator 210. T-F converter 402 converts the incoming voice signal from an analog time domain signal to a digital signal representing the frequency components of the voice signal. In a preferred embodiment, T-F converter 402 is a discrete Fourier transform (DFT) unit. Frequency shifter 404 operates on the digital signal provided by T-F converter 402 to shift one or more of the frequency bands of the voice signal at a rate and frequency shift determined by low-frequency oscillator 208. Frequency shifter 404 is a device well-known in the art. F-T converter 406 then converts the shifted digital signal into a frequency shifted analog signal for provision to telephone station set 108. In a preferred embodiment, F-T converter 406 is an inverse DFT unit.

For the time-frequency conversions of this embodiment, the inventor has found that a DFT provides more satisfactory results than a conventional fast Fourier transform (FFT). Because the FFT is limited to operation on regularly-spaced frequency bands, some of the phase information in the voice signal can be lost, producing undesirable echo-type artifacts in the reconstructed voice signal. In a DFT, frequency bands can be selected to minimize the loss of this phase information. This concept is discussed in greater detail in a commonly-owned, copending application entitled "Method and Apparatus for Suppressing Echo in Telephony" having application number (to be assigned, Attorney Docket Number CCK-96-008), which is incorporated herein by reference.

In a fourth embodiment of the present invention, the voice processor reduces the power level in one or more predetermined frequency bands of the voice signal to a predetermined power level. The frequency bands are selected to coincide with the DTMF frequencies that should not be triggered by the voice signal. The power level is selected to be below the level necessary to trigger a tone detector. In a preferred embodiment, the selected frequency bands include the 908–974 Hz frequency band, and the selected power level is −55 dBm.

Figure 5:
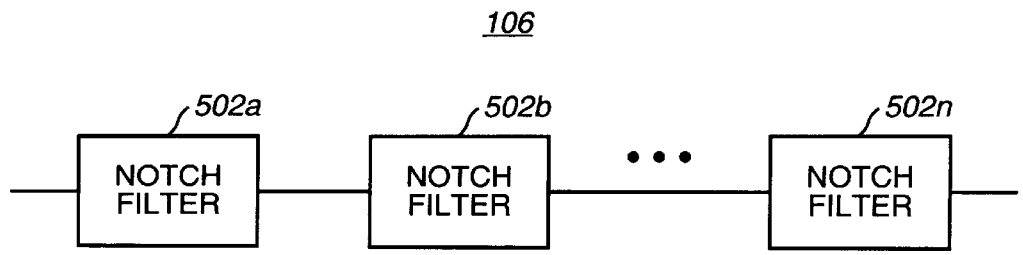
FIG. 5 is a circuit block diagram of an implementation of voice processor 106 according to a fourth embodiment of the present invention.

FIG. 5 is a circuit block diagram of an implementation of voice processor 106 according to a fourth embodiment of the present invention. In this embodiment, voice processor 106 includes one or more notch filters 502 connected in series. Notch filters are well-known in the relevant art. Each notch filter 502 is tuned to reduce the power level in a predetermined frequency band below a predetermined power level.

In a preferred embodiment of the present invention, one notch filter 502 is used to prevent a voice signal from emulating the DTMF signals that would be generated by pressing the "*", "0", or "#" key on a conventional telephone keypad. These keys are often used during a call to invoke calling functions. Pressing any one of these keys would generate a DTMF signal having as one of its tones a strong sinusoidal signal of approximately 941 Hz frequency. For a tone detector that requires a tone to be within 3.5% of its nominal frequency and at least −55 dBm, the notch filter is designed to suppress the power level of signals within the 908–974 Hz frequency band to −55 dBm or less.

While various embodiments of the present invention have been described above, it should be understood that they have been presented by way of example, and not limitation. It will be apparent to persons skilled in the relevant art that various changes in form and detail can be made therein without departing from the spirit and scope of the invention. For example, the present invention can be implemented as a commercially-available digital signal processor operating under software control, as is well known in the art. Thus the present invention should not be limited by any of the above-described exemplary embodiments, but should be defined only in accordance with the following claims and their equivalents.

What is claimed is:

1. A telephone set for processing voice signals to avoid triggering tone detectors, comprising:

a microphone for receiving a voice signal;

an on-hook/off-hook control point having a mouth lead; and a voice processor electrically coupled between said microphone and said mouth lead of said on-hook/off-hook control point for frequency-shifting one or more predetermined frequency bands of said voice signal by a predetermined frequency shift at a predetermined shifting rate.

2. The telephone set of claim 1, wherein said predetermined frequency shift is approximately ±2.5% of the center frequency of said voice signal.

3. The telephone set of claim 1, wherein said predetermined shifting rate is approximately 40 Hz.

4. The telephone set of claim 1, wherein said voice processor comprises:

a variable delay unit, electrically coupled between said input port and said output port, for modifying said voice signal in accordance with a predetermined clocking rate.

5. The telephone set of claim 4, wherein said voice processor comprises:

a low-frequency oscillator for establishing said predetermined shifting rate; and a clock generator, electrically coupled to said low-frequency oscillator and said variable delay unit, for clocking said variable delay unit at said predetermine clocking rate.

6. The telephone set of claim 4, wherein said voice processor further comprises:

a first amplifier electrically coupled between said microphone and said variable delay unit; and a second amplifier electrically coupled between said mouth lead of said on-hook/off-hook control point and said variable delay unit.

7. The telephone set of claim 4, wherein said variable delay unit comprises:

a frequency shifter;

a time-to-frequency converter electrically coupled between said frequency shifter and said microphone; and a frequency-to-time converter electrically coupled between said frequency shifter and said mouth lead of said on-hook/off-hook control point.

8. The telephone set of claim 7, wherein:

said time-to-frequency converter includes a discrete Fourier transform unit; and said frequency-to-time converter includes a discrete inverse Fourier transform unit.

9. The telephone set of claim 4, wherein said variable delay unit comprises:

a bit shifter;

an A-D converter electrically coupled between said bit shifter and said input port; and a D-A converter electrically coupled between said bit shifter and said output port.

10. The telephone set of claim 9, wherein said bit shifter includes a digital shift register.

11. The telephone set of claim 9, wherein said bit shifter includes a circular buffer.

12. A voice processor for processing voice signals to avoid triggering tone detectors, comprising:

an input port operable to connect to a microphone in a telephone handset for receiving a voice signal from said microphone;

an output port operable to connect to a mouth lead of an on-hook/off-hook control point in a telephone station set; and a module electrically coupled between said input port and said output port for frequency-shifting one or more predetermined frequency bands of said voice signal by a predetermined frequency shift at a predetermined shifting rate.

13. The voice processor of claim 12, wherein said predetermined frequency shift is approximately ±2.5% of the center frequency of said voice signal.

14. The voice processor of claim 12, wherein said module comprises:

a variable delay unit, electrically coupled between said input port and said output port, for modifying said voice signal in accordance with a predetermined clocking rate.

15. The voice processor of claim 14, wherein said variable delay unit comprises:

a frequency shifter;

a time-to-frequency converter electrically coupled between said frequency shifter and said input port; and a frequency-to-time converter electrically coupled between said frequency shifter and said output port.

16. The voice processor of claim 15, wherein:

said time-to-frequency converter includes a discrete Fourier transform unit; and said frequency-to-time converter includes a discrete inverse Fourier transform unit.

17. The voice processor of claim 14, wherein said variable delay unit comprises:

a bit shifter;

an A-D converter electrically coupled between said bit shifter and said input port; and a D-A converter electrically coupled between said bit shifter and said output port.

18. The voice processor of claim 17, wherein said bit shifter includes a digital shift register.

19. The voice processor of claim 17, wherein said bit shifter includes a circular buffer.

20. The voice processor of claim 14, wherein said module comprises:

a low-frequency oscillator for establishing said predetermined shifting rate; and a clock generator, electrically coupled to said low-frequency oscillator and said variable delay unit, for clocking said variable delay unit at said predetermine clocking rate.

21. The voice processor of claim 14, wherein said module further comprises:

a first amplifier electrically coupled between said input port and said variable delay unit; and a second amplifier electrically coupled between said output port and said variable delay unit.

22. The voice processor of claim 12, wherein said predetermined shifting rate is approximately 40 Hz.

* * * * *